United States Patent
Rotem et al.

(10) Patent No.: US 11,167,429 B1
(45) Date of Patent: Nov. 9, 2021

(54) COMPOSITE SEALING ELEMENT FOR IMPROVING VACUUM GRIPPER PERFORMANCE ON IRREGULAR SURFACE TOPOLOGIES

(71) Applicant: Nemo Power Tools Ltd, Sheung Wan (HK)

(72) Inventors: Nimrod Rotem, Sheung Wan (HK); Oleg Joukov, Shaar Efraim (IL); Eduard Tsfasman, Shaar Efraim (IL)

(73) Assignee: Nemo Power Tools Ltd., Sheung Wan (HK)

( * ) Notice: Subject to any disclaimer, the term of this patent is extended or adjusted under 35 U.S.C. 154(b) by 0 days.

(21) Appl. No.: 17/328,641

(22) Filed: May 24, 2021

(51) Int. Cl.
*B25J 15/06* (2006.01)
*B25B 11/00* (2006.01)
*F16J 15/46* (2006.01)

(52) U.S. Cl.
CPC ........... *B25J 15/0683* (2013.01); *B25J 15/06* (2013.01); *B25J 15/0616* (2013.01); *B25B 11/005* (2013.01); *F16J 15/46* (2013.01)

(58) Field of Classification Search
CPC . B25J 15/0616; B25J 15/0683; B66C 1/0231; B25B 11/005; B25B 11/007; F16J 15/46
USPC ......................................................... 294/189
See application file for complete search history.

(56) References Cited

U.S. PATENT DOCUMENTS

| | | | |
|---|---|---|---|
| 3,326,593 A * | 6/1967 | Farmer .................... | B66F 9/181 294/189 |
| 3,377,096 A * | 4/1968 | Wood ..................... | B66C 1/0281 294/189 |
| 3,578,372 A * | 5/1971 | Schuler ...................... | F16P 3/00 294/189 |
| 3,910,620 A * | 10/1975 | Sperry ................... | B66C 1/0243 294/189 |
| 4,109,922 A * | 8/1978 | Martin .................... | B23K 15/06 277/646 |
| 6,517,130 B1 * | 2/2003 | Donoso ................ | B25J 15/0616 294/185 |
| 2020/0262087 A1 * | 8/2020 | Douglas ............... | B25J 15/0691 |

FOREIGN PATENT DOCUMENTS

GB      1 309 273    * 3/1973

* cited by examiner

*Primary Examiner* — Dean J Kramer
(74) *Attorney, Agent, or Firm* — Intellent Patents LLC; Ahmed Alhafidh

(57) ABSTRACT

A vacuum gripper sealing element allows a vacuum gripper to suitably conform to irregular surface topology without compromising vacuum conditions. The sealing element utilizes a compressible sealing element which at least partially encapsulates an elastic sealing element. Upon being pressed against an object surface, the compressible sealing element will conform within and around macroscopic peaks, valleys and other irregular physical features. While conforming to macro-scale features, the compressible sealing element applies pressure isotropically upon the encapsulated elastic sealing element, which elastically conforms to micro-scale features while pressed thereagainst. The elastic sealing element has a fluid-filled interior that is surrounded by an elastic outer layer. While under pressure against an irregular surface topology, the fluid-filled interior displaces so as to redistribute internal forces, conforming the elastic outer layer to the micro-scale features of the object surface.

4 Claims, 2 Drawing Sheets

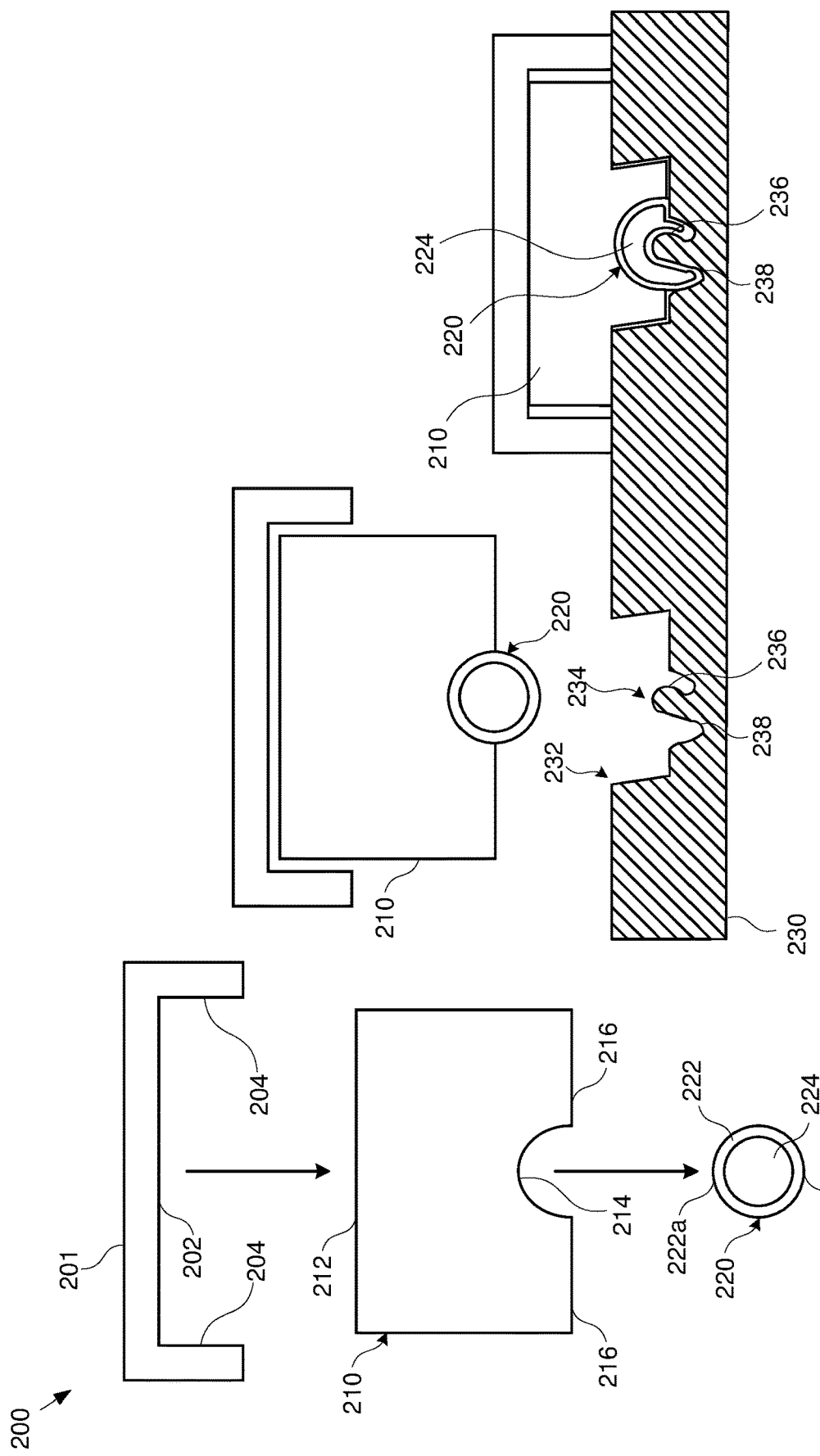

COMPOSITE SEALING ELEMENT FOR IMPROVING VACUUM GRIPPER PERFORMANCE ON IRREGULAR SURFACE TOPOLOGIES

CROSS-REFERENCE TO RELATED APPLICATIONS

This application is related to U.S. Patent Publication No. 2020/0338695, which is incorporated by reference herein.

FIELD OF TECHNOLOGY

This disclosure relates generally to electric suction cup vacuum grippers and, more particularly, to a composite sealing element usable therewith which improves vacuum performance over irregular surface topologies.

BACKGROUND

A vacuum gripper is used to grip an object at the object's surface by creating a vacuum between the gripper and the object surface and utilizing a sealing element that is urged against the object surface to create a tight seal. U.S. Patent Publication No. 2020/0338695 (hereinafter '695) describes a vacuum gripper which chiefly comprises a rigid base element and a loop-shaped vacuum seal element attached thereto. Reference is made to FIG. 1 (i.e., FIG. 8 of '659) in which a seal element 145 comprises a contact surface 145c that at least partially contacts with an object surface and an encircling surface 145d oriented transversely to the contact surface 145c so as to define a chamber. The seal element 145 is elastically deformable at the contact surface to enable conforming to the object surface when pressed thereagainst. During regular operation, an air extraction means 132 mounted on a side of the rigid base element 141 opposite to the seal element 145 causes the chamber to decrease in pressure, which urges the contact surface towards and grips the object surface when pressed thereagainst.

Deformable materials such as closed-cell foam are used with different heights and widths to provide a sealing element 145 with suitable collapsible material to fill the pockets of an object's irregular surface when urged thereagainst. However, the surface of the foam may have a low friction coefficient and may slip regardless of the vacuum strength. Depending on its physical dimensions, the sealing element may also be prone to over-compression or over-deformation across its width or height. As such, a bracing structure 144 having high rigidity and/or a high friction coefficient can be used behind or around the sealing element 145 such that when the sealing element 145 collapses due to vacuum conditions, the bracing structure 144 comes into contact with the object's surface and ensures a strong grip on the object surface. However, this does not prevent the sealing element 145 from shifting laterally, compromising vacuum conditions due to lack of vertical rigidity. To prevent these lateral shifts in the foam layer, a seal structural element 143 is used between the sealing element 145 and the bracing structure 144. Also, at least a portion of the sealing element 145 and the bracing structure 144 is encapsulated by the rigid base element 141.

Although the seal structure described above provides reliable suction when used on substantially even or smooth surfaces, performance deteriorates rapidly on uneven surfaces that possess sharp irregularities at low and/or high scales. For example, porous surfaces such as cinderblocks, fibrous surfaces such as treated/untreated lumber, stone surfaces such as granite slabs, rough ceramic surfaces, and other uneven surfaces may have a stochastic surface topology, with a high degree of sharp, randomly angled edges whether at the macro or micro scale. These surface topologies may follow fractalized patterns or dissimilar patterns at various scales despite having a low overall vertical variance. Objects with irregular surfaces, whether the irregularities are analogous at different scales or not, provide significant challenges to the sealing element 145 and the bracing structure 144, whether used together or separately.

Another exemplary sealing element is used in bag valve masks, which comprise a fluid-filled flexible mask that seals around a patient's mouth when the mask is pressed thereagainst. The mask seal is essentially an annular, fluid-filled tube made of latex-free silicone or nylon. As the mask is compressed against a patient's face, internal compression and displacement of the fluid causes the contact surface of the mask to push outwards against the surface of a patient's skin around the mouth. The contact surface is inelastic and conforms well enough to smooth changes in the skin surface as long as the mask is pressed firmly against the patient's mouth. The inelastic nature of the mask material serves an important purpose—that of preventing deformations and subsequent leakage as pressure gradients form between the inside and outside of the mask while the bag is inflated. However, inelastic surfaces are also unable to finely conform to irregular surface textures because although pressures may be uniformly applied across the contact surface, the material of the contact surface is not flexible enough to conform around sharp depressions and contours at a fine scale.

"Irregular surface topologies" may refer to a wide range of naturally-occurring or artificial object textures that pose significant challenges to current vacuum gripping seal technologies. As used herein, an irregular surface topology can be characterized as having a high number of peaks and valleys in a deterministic or random fashion. The height distribution of the peaks and valleys with respect to an arithmetic average may be isotropic or anisotropic, Gaussian or non-Gaussian. Spacing and sloping between peaks and valleys may or may not follow a pattern. Irregular surface topology also typically exhibits multiscale roughness and often can be characterized by fractal geometry. An ideal sealing solution that can conform to an irregular surface topology necessarily addresses multiscale roughness.

Thus, there is a need for a vacuum gripper sealing element which can conform to surface irregularities at multiple scales.

SUMMARY

Aspects of the following disclosure involve a composite sealing element for use with vacuum grippers to improve gripping performance on objects with irregular surface topology. In one aspect, a vacuum gripper sealing element involves a compressible sealing element and an elastic sealing element. A first attachment surface of the compressible sealing element is mountable to a receiving surface of a vacuum gripper base element. A second attachment surface of the compressible sealing element is adhered to an attachment surface of the elastic sealing element.

A contact surface of the compressible sealing element conforms to a macroscopic texture of an object surface when the vacuum gripper sealing element is pressed thereagainst. This contact surface of the compressible sealing element is continuous with a contact surface of the elastic sealing element. The contact surface of the elastic sealing element elastically conforms to an irregular surface topology of the object surface when the vacuum gripper sealing element is pressed thereagainst.

The compressible sealing element encapsulates at least a portion of the elastic sealing element. When the compressible sealing element and the elastic sealing element are deformed under pressure, the second attachment surface of the compressible sealing element applies a pressure isotropically across the attachment surface of the elastic sealing element.

BRIEF DESCRIPTION OF THE DRAWINGS

The embodiments of this invention are illustrated by way of example and not limitation in the figures of the accompanying drawings, in which like references indicate similar elements and in which:

FIG. 2 is an exploded cross-section of an exemplary composite sealing element, according to one or more embodiments.

FIG. 3A is a cross-section showing the composite sealing element of FIG. 2 before being urged against an object surface.

FIG. 3B is a cross-section showing the composite sealing element of FIG. 2 after being urged against the object surface.

Figure 1:
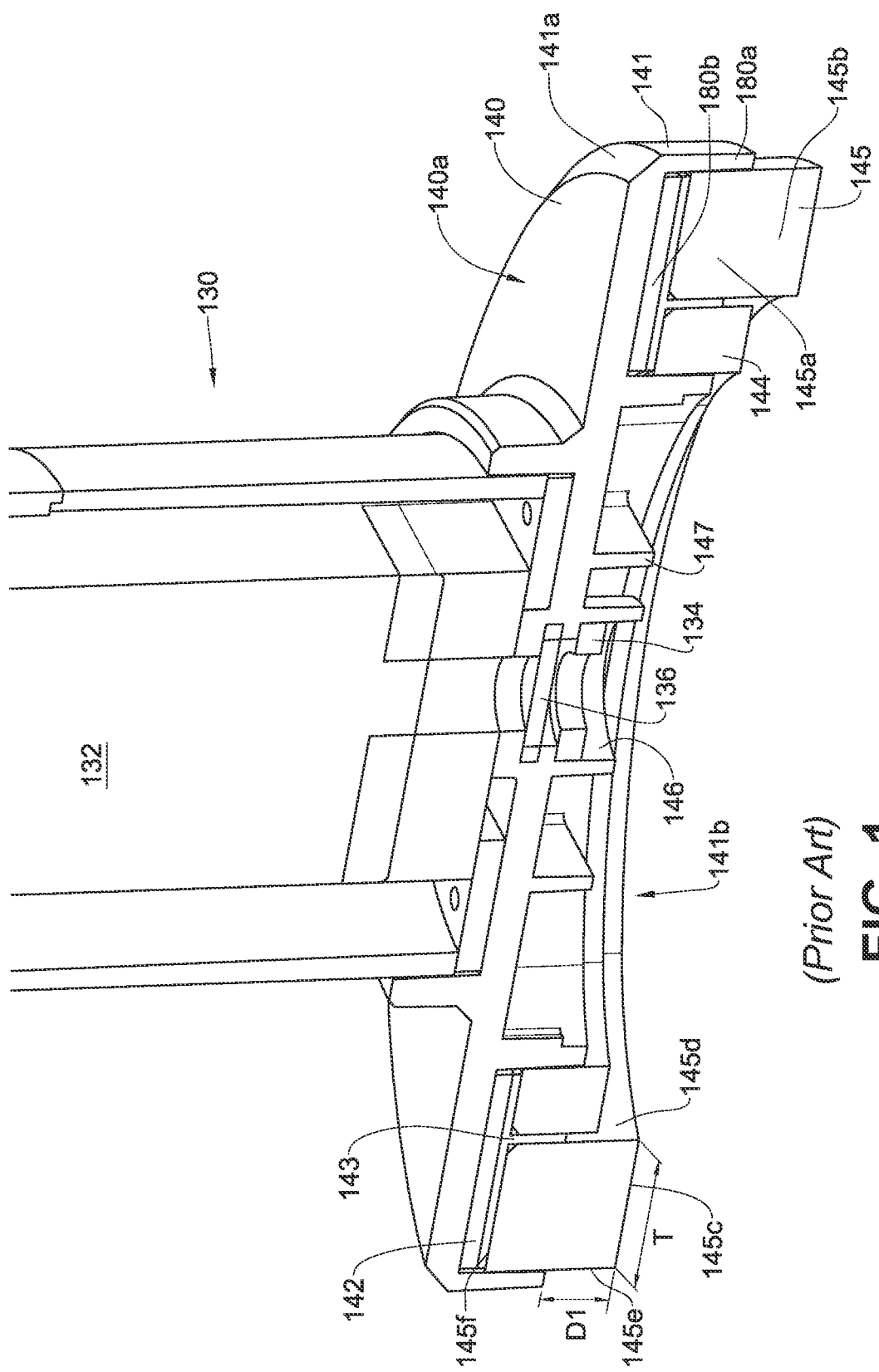
FIG. 1 is a perspective view of a current vacuum gripper sealing element.

Other features of the present embodiments will be apparent from the accompanying drawings and from the detailed description that follows.

DETAILED DESCRIPTION

Example embodiments, as described below, may be used to provide a composite sealing element which improves a vacuum gripper's performance when used with irregular surface topologies. Reference is made to FIG. 2, which is an exploded cross-section of an exemplary composite sealing element. In one embodiment, a vacuum gripper sealing element 200 comprises a compressible sealing element 210 and an elastic sealing element 220. The compressible sealing element 210 may be of a compressible material, such as foam or rubber. The compressible sealing element 210 is characterized by its localized collapsibility, i.e., its capacity to absorb high pressures locally but maintain uniform outward pressure (isotropic pressure) in other, low pressure areas. The elastic sealing element 220 comprises an elastic outer layer 222 and a fluid-filled interior 224. In addition to being compressible to a degree, the elastic sealing element 220 redirects external pressures internally through the fluid-filled interior 224 and flexibly conforms the elastic outer layer 222 to fine surface details. In general, forces from the compressible sealing element 210 while under compression are distributed to the elastic sealing element 220, which elastically conforms to irregular surface topologies.

The compressible sealing element 210 comprises a first attachment surface 212, a second attachment surface 214, and a contact surface 216. The first attachment surface 212 is mountable to a receiving surface of a vacuum gripper base element 201. The vacuum gripper base element 201 may be analogous to the vacuum gripper base element 140 of FIG. 1. The receiving surface 202 may adhere directly to the first attachment surface 212 or indirectly through an intermediate leakage seal layer. The receiving surface 202 may be surrounded laterally by inner sidewalls 204 which are meant to encompass a portion of the sides of the compressible sealing element 210. The inner sidewalls 204 serve to support the compressible sealing element 210 and direct deformations thereof away from the vacuum gripper base element 201 and toward an object surface.

The second attachment surface 214 of the compressible sealing element 210 contacts and/or is adhered to an attachment surface 222a of the elastic outer layer 222. A contact surface 216 of the compressible sealing element 210 is continuous with a contact surface 222b of the elastic sealing element 220. Although the shape of the elastic sealing element 220 is circular as shown in FIG. 2, it should be understood that other shapes may be suitable, in particular because the elastic nature of the elastic outer layer 222 allows the elastic sealing element 220 to more easily conform to different types of irregular surface topology. For example, a semi-circularly-shaped elastic sealing element 220 which may have a contact surface 222b that is flush with the contact surface 216 of the compressible sealing element 210 may be more suitable for a surface that has relatively small valleys and potentially large peaks. On the other hand, an elastic sealing element 220 with a contact surface 222b that at least partially protrudes or bulges away from the contact surface 216 of the compressible sealing element 210 may be suitable for a surface that has relatively deep valleys and low, if any, peaks.

Reference is made to FIGS. 3A and 3B which show cross sections of the vacuum gripper sealing element 200 before and after compression against an object surface 230, respectively. Object surface 230 comprises irregular surface topology, which may comprise primary topology 232 and secondary topology 234. Primary topology 232 may refer to macroscopic physical features that the compressible sealing element 210 can easily conform to, such as the major peaks and valleys that an irregular surface may typically have. Secondary topology 234 may refer to microscopic physical features that are encompassed within the primary topology 232 but exist at a finer scale such that the contact surface 216 of the compressible sealing element 210 cannot suitably conform to them. This can include a surface with, for example, many small but sharp peaks 236 and valleys 238 in disparate locations, or an open porous network. However, the elastic outer layer 222 of the elastic sealing element 220 may be able to flexibly conform to these features of the secondary topology 234. This is because the compressible sealing element 210 exerts pressure isotropically upon the attachment surface 222a, which subsequently compresses the fluid-filled interior 224, which presses against the contact surface 222b, causing the contact surface 222b to elastically conform to the features of the secondary topology 234. This can allow the elastic sealing element 220 to receive pressure upon the contact surface 222b in one area and conform to secondary topology in a completely different area. This is accomplished by the fluid-filled interior 224 which readily displaces these internal pressures throughout the elastic sealing element 220.

The fluid-filled interior 224 of the elastic sealing element 220 may comprise a fluid such as water or oil. Although different fluids may suffice, fluids with higher density and therefore lower compressibility are preferable. Other fluid dynamic factors such as viscosity may affect compressibility under flow. A higher density fluid under pressure will not compress as much as displace to fill in the gaps in a surface against which it is pressed. Additionally, it is important to note that this required behavior of the elastic sealing element 224—that of conforming to secondary topology 234—is not possible without the compressible sealing element 210 exerting its pressure isotropically upon the elastic sealing element 220. If the forces exerted upon the elastic sealing element 220 by the compressible sealing element 210 were not uniformly applied, the elastic sealing element 220 would not, for example, displace a partial volume of the fluid-filled interior 224 around a peak 236 in one area to another area where the elastic sealing element 220 is pressed against a valley 238.

Additionally, the encapsulation of the elastic sealing element 220 by the compressible sealing element 210 serves as a guide for the elastic sealing element 220, allowing the isotropic forces exerted upon the elastic sealing element 220 by the compressible sealing element 210 to be directed toward the object surface 230. This prevents any portion of the contact surface 222b of the elastic sealing element 220 from 'leaking' out between the contact surface 216 and the object surface 230. It is important to note that during regular operation, the contact surface 216 of the compressible sealing element 210 would typically contact the primary topology 232 of the object surface 230 first and begin compressing before the contact surface 222b of the elastic sealing element reaches the secondary topology 234. Additionally, the inner sidewalls 204 of the vacuum gripper base element 201 reinforce the sides of the compressible sealing element 210, further supporting the elastic sealing element 220 and directing it to the secondary topology 234.

What is claimed is:

1. A vacuum gripper sealing element comprising:
   a compressible sealing element comprising a first attachment surface, a second attachment surface, and a contact surface,
      wherein the first attachment surface is mountable to a receiving surface of a vacuum gripper base element,
      wherein the contact surface conforms to a macroscopic texture of an object surface when the vacuum gripper sealing element is pressed thereagainst;
   an elastic sealing element comprising an attachment surface and a contact surface;
      wherein the second attachment surface of the compressible sealing element is adhered to the attachment surface of the elastic sealing element,
      wherein the contact surface of the elastic sealing element is continuous with the contact surface of the compressible sealing element and elastically conforms to an irregular surface topology of the object surface when the vacuum gripper sealing element is pressed thereagainst,
      wherein the compressible sealing element encapsulates at least a portion of the elastic sealing element such that, when the compressible sealing element and the elastic sealing element are deformed under pressure, the second attachment surface of the compressible sealing element applies a pressure isotropically across the attachment surface of the elastic sealing element; and
      wherein the vacuum gripper base element comprises inner sidewalls which reinforce the sides of the compressible sealing element and direct the elastic sealing element to the irregular surface topology.

2. The sealing element of claim 1, wherein the elastic sealing element comprises a fluid-filled interior and an elastic outer layer.

3. The sealing element of claim 2, wherein the contact surface of the compressible sealing element conforms to a primary topology of the object surface and the contact surface of the elastic sealing element conforms to a secondary topology of the object surface.

4. The sealing element of claim 3, wherein the compressible sealing element conforming to the primary topology causes the pressure applied isotropically by the compressible sealing element upon the elastic sealing element to displace the fluid-filled interior therein and conform the elastic outer layer thereof to the secondary topology.

* * * * *